(12) United States Patent
Nakayama et al.

(10) Patent No.: US 8,298,622 B2
(45) Date of Patent: Oct. 30, 2012

(54) SILICA AEROGEL COATING AND ITS PRODUCTION METHOD

(75) Inventors: Hiroyuki Nakayama, Tokyo (JP); Kazuhiro Yamada, Saitama-ken (JP); Yasuhiro Sakai, Saitama-ken (JP); Maki Yamada, Saitama-ken (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 1045 days.

(21) Appl. No.: 11/407,907

(22) Filed: Apr. 21, 2006

(65) Prior Publication Data
US 2006/0239886 A1 Oct. 26, 2006

(30) Foreign Application Priority Data

Apr. 22, 2005 (JP) ................................. 2005-125593

(51) Int. Cl.
*C08F 2/48* (2006.01)
(52) U.S. Cl. ......... 427/493; 427/508; 427/515; 427/517
(58) Field of Classification Search .................. 427/493, 427/508, 515, 517
See application file for complete search history.

(56) References Cited

U.S. PATENT DOCUMENTS

| | | | |
|---|---|---|---|
| 4,530,569 A | 7/1985 | Squire | |
| 4,754,009 A | 6/1988 | Squire | |
| 5,236,651 A * | 8/1993 | Garvey et al. | 264/140 |
| 5,948,482 A | 9/1999 | Brinker et al. | |
| 5,993,898 A | 11/1999 | Nagatsuka | |
| 6,528,160 B1 | 3/2003 | Takushima | |
| 6,531,180 B1 | 3/2003 | Takushima et al. | |
| 6,663,957 B1 | 12/2003 | Takushima et al. | |
| 6,791,649 B1 * | 9/2004 | Nakamura et al. | 349/137 |
| 6,809,170 B2 * | 10/2004 | Roesler et al. | 528/28 |
| 6,984,483 B1 * | 1/2006 | Roscher et al. | 430/280.1 |
| 7,348,393 B2 * | 3/2008 | Frohlich et al. | 528/32 |
| 2004/0242830 A1 | 12/2004 | Frohlich et al. | |
| 2006/0154044 A1 | 7/2006 | Yamada et al. | |
| 2006/0281828 A1 | 12/2006 | Nakayama et al. | |

FOREIGN PATENT DOCUMENTS

| | | |
|---|---|---|
| JP | 61-232214 | 10/1986 |
| JP | 63-018964 | 4/1988 |
| JP | 63-238111 | 10/1988 |
| JP | 63-238115 | 10/1988 |
| JP | 10-045429 | 2/1998 |
| JP | 2756366 | 3/1998 |
| JP | 10-227902 | 8/1998 |
| JP | 10-319209 | 12/1998 |
| JP | 2001-188104 | 7/2001 |
| JP | 2003-043202 | 2/2003 |
| JP | 2003-119052 | 4/2003 |
| JP | 2004-182491 | 7/2004 |
| JP | 2004-277540 | 10/2004 |
| JP | 2005-037927 | 2/2005 |
| JP | 2005-221911 | 8/2005 |
| JP | 2006-11175 | 1/2006 |
| WO | 01/04186 | 1/2001 |
| WO | 2004/104113 | 12/2004 |
| WO | 2005/001525 | 1/2005 |

OTHER PUBLICATIONS

English language Abstract of JP 63-238111.
English language Abstract of JP 2005-221911.
English language Abstract of JP 63-238115.
U.S. Appl. No. 11/423,010 to Nakayama et al., filed Jun. 8, 2006.
English language Abstract of JP 2003-043202.
English language Abstract of JP 10-227902.
English language Abstract of JP 2003-119052.
Japanese Office Action that issued with respect to patent family member Japanese Patent Application No. 2005-125593, mailed Aug. 11, 2010, along with an English language translation thereof.
Japanese Office Action regarding Japanese Application No. 2006-153552, dated Apr. 27, 2011 and English translation thereof.
Japan Office action that issued with respect to patent family member Japanese patent Application No. 2005-125593, dated Jun. 8, 2011 along with an english translation thereof.

* cited by examiner

*Primary Examiner* — Elena T Lightfoot
(74) *Attorney, Agent, or Firm* — Greenblum & Bernstein, P.L.C.

(57) ABSTRACT

Methods for producing a silica aerogel coating by: producing a wet gel formed by the hydrolysis and polymerization of an alkoxysilane having an ultraviolet-polymerizable unsaturated group; organically modifying the wet gel with an organic-modifying agent to obtain an organically modified silica having a modification ratio of 10-30% based on a total amount of Si—OH in the wet gel; coating a dispersion of the organically modified silica on a substrate to form a layer; and subjecting the layer of the organically modified silica to ultraviolet irradiation and baking, wherein the silica aerogel coating includes the organically modified silica and wherein the silica aerogel coating has a refractive index in the range of 1.05-1.2.

22 Claims, No Drawings

SILICA AEROGEL COATING AND ITS PRODUCTION METHOD

FIELD OF THE INVENTION

The present invention relates to a silica aerogel coating having nanometer-sized fine pores, particularly to a silica aerogel coating having a low refractive index and excellent toughness and water repellency suitable for an anti-reflection coating, and its production method.

BACKGROUND OF THE INVENTION

Anti-reflection coatings have conventionally been produced by a physical vapor deposition method such as vacuum vapor deposition, sputtering, ion plating, etc. Because single-layer anti-reflection coatings are designed to have smaller refractive indexes than those of substrates, coating materials having extremely small refractive indexes are desired for anti-reflection coatings formed on substrates having small refractive indexes. Among coatings formed by a physical vapor deposition method, an $MgF_2$ coating has a minimum refractive index of 1.38. However, $MgF_2$ does not have a refractive index of 1.2-1.25, which is ideal for anti-reflection coatings for lenses having a refractive index of about 1.5. The anti-reflection coating having a refractive index of 1.2-1.25 exhibits reflectance of less than 1% in a visible-light region having a wavelength of 400-700 nm, while an anti-reflection coating of $MgF_2$ having a refractive index of 1.38 exhibits reflectance of higher than 1%, although less than 2%.

Liquid-phase methods such as a sol-gel method, an SOG method, etc. are recently used to produce anti-reflection coatings. The liquid-phase methods are advantageous in producing anti-reflection coatings without needing a large apparatus unlike the physical vapor deposition method, and without exposing substrates to high temperatures. However, anti-reflection coatings produced by the liquid-phase methods have refractive indexes near 1.37 at minimum, which is substantially on the same level as those obtained by the physical vapor deposition methods, and there are no large differences in anti-reflection characteristics therebetween. Accordingly, in both methods, low-refractive-index materials and high-refractive-index materials should be laminated to form multi-layer coatings, to have reflectance of less than 1% in a visible-light-wavelength region.

Known as a material having a smaller refractive index than that of magnesium fluoride is silica aerogel. Silica aerogel having a density of 0.01 g/cc or less and a refractive index of less than 1.1 can be formed by preparing a wet silica gel by the hydrolysis of an alkoxysilane, and drying it by an ultra-critical fluid of carbon dioxide, water, an organic solvent, etc. However, this method is highly costly because it needs lengthy steps using an ultra-critical-drying apparatus. In addition, the silica aerogel produced by this method is brittle because of extremely small toughness, failing to be put into practical use.

U.S. Pat. No. 5,948,482 describes a method for producing a thin silica aerogel coating by using a material obtained by (a) preparing a sol containing $SiO_2$, (b) aging it to a gel, (c) modifying its surface with organic groups, and (d) subjecting the organically modified gel to ultrasonic treatment. This method can produce a silica aerogel coating having a porosity of 99% or more, thus a low refractive index. However, the silica aerogel coating produced by this method has small mechanical strength and poor scratch resistance.

OBJECT OF THE INVENTION

Accordingly, an object of the present invention is to provide a silica aerogel coating having a low refractive index and excellent toughness and water repellency, which is suitable for anti-reflection coatings, and its production method.

DISCLOSURE OF THE INVENTION

As a result of intense research in view of the above object, the inventors have found that a silica aerogel coating having excellent toughness and a low refractive index can be obtained by forming a thin coating by a dispersion of silica having an unsaturated group, and then polymerizing the unsaturated group. The present invention has been completed based on such finding.

Thus, the first method of the present invention for producing a silica aerogel coating comprises the steps of organically modifying a wet gel formed by the hydrolysis and polymerization of an alkoxysilane having an ultraviolet-polymerizable unsaturated group, and subjecting a layer of the resultant organically modified silica to ultraviolet irradiation and baking.

In the first production method, it is preferable that the alkoxysilane is a monosilane having an unsaturated group and an alkoxy group, that the monosilane is polymerized to an oligomer using an acidic catalyst, and that the oligomer is polymerized using a basic catalyst to obtain the wet gel. Usable for the organic modification of the wet gel is an organic-modifying agent, which may or may not have an unsaturated group, preferably a silane coupling agent, which may or may not have an unsaturated group.

The second method of the present invention for producing a silica aerogel coating comprises the steps of reacting a wet gel formed by the hydrolysis and polymerization of an alkoxysilane with an organic-modifying agent having an ultraviolet-polymerizable unsaturated group, and subjecting a layer of the resultant organically modified silica to ultraviolet irradiation and baking.

In the second production method, the alkoxysilane is polymerized to an oligomer using an acidic catalyst, and the oligomer is polymerized using a basic catalyst to obtain the wet gel.

In any production method, solvents for the wet gel are preferably alcohols having 1-3 carbon atoms. It is preferable to disperse the organically modified silica by an ultrasonic treatment, and coat a dispersion of the organically modified silica on a substrate to form the layer. A polymerization initiator is preferably added to the dispersion. The dispersing medium is preferably at least one selected from the group consisting of carboxylic esters, ketones and alcohols. The temperature of the baking is preferably 50-150° C.

The silica aerogel coating of the present invention has a polymerized organic-modifying chain.

The organic-modifying chain of the silica aerogel coating preferably comprises a carbon chain having 2-10 carbon atoms. The organic-modifying chain is preferably formed by ultraviolet irradiation on the dispersion of the organically modified silica coated on the substrate.

DESCRIPTION OF THE PREFERRED EMBODIMENTS

[1] First Production Method
(1) Starting Material
(a-1) Alkoxysilane Monomer Having Unsaturated Group
The alkoxysilane monomer has an organic group having at least one double or triple bond (hereinafter referred to as "unsaturated group"), and an alkoxy group. The unsaturated group has 2-10 carbon atoms, preferably 2-4 carbon atoms.

The preferred alkoxysilane monomer is represented by the following general formula (1):

$$R^1{}_n Si(OR^2)_{4-n} \quad (1),$$

wherein $R^1$ represents an organic group having an ultraviolet-polymerizable, unsaturated bond and 2-10 carbon atoms, $R^2O$ represents an alkoxy group having 1-4 carbon atoms, and n represents an integer of 1-3. The alkoxysilane monomer preferably has one unsaturated group and three alkoxy groups (n=1). Accordingly, the more preferred alkoxysilane monomer is represented by the following general formula (2):

$$R^1 Si(OR^2)_3 \quad (2).$$

Using such alkoxysilane as a starting material, the hydrolysis of an alkoxy group and the polymerization of an unsaturated group sufficiently occur, resulting in a anti-reflection coating having excellent uniformly and toughness.

The unsaturated group $R^1$ is an organic group having at least one ultraviolet-polymerizable, unsaturated bond, which may have a substituting group such as a methyl group, an ethyl group, etc. Specific examples of the unsaturated group $R^1$ include a vinyl group, an allyl group, a methacryloxy group, an aminopropyl group, a glycidoxy group, an alkenyl group and a propargyl group. $R^2$ is an organic group, which may be the same as or different from $R^1$. Specific examples of the alkoxy group $R^2O$ include a methoxy group, an ethoxy group, a propoxy group, a butoxy group, an isopropoxy group and an s-butoxy group.

Specific examples of the alkoxysilane monomers inlcude trimethoxyvinylsilane, triethoxyvinylsilane, allyltrimethoxysilane, allyltriethoxysilane, tributoxyvinylsilane, tripropoxyvinylsilane, allyltributoxysilane, allyltripropoxysilane, dimethoxydivinylsilane, diallyldimethoxysilane, diethoxydivinylsilane, diallyldiethoxysilane, 3-methacryloxypropyltrimethoxysilane, 3-methacryloxypropyltriethoxysilane, 3-acryloxypropyltrimethoxysilane, p-styryltrimethoxysilane, 3-isocyanatepropyltriethoxysilane, trimethoxy(3-butenyl)silane, triethoxy(3-butenyl)silane, di(3-butenyl) dimethoxysilane, and di(3-butenyl)diethoxysilane.

(a-2) Alkoxysilane Oligomer Having Unsaturated Group

An oligomer of the alkoxysilane having an unsaturated group may be used as a starting material. The alkoxysilane oligomer also has at least one unsaturated group and at least one alkoxy group.

The alkoxysilane oligomer having an unsaturated group is preferably represented by the following general formula (3):

$$Si_m O_{m-1} R^a{}_{2m+2-x} OR^b{}_x \quad (3),$$

wherein $R^a$ represents an organic group having an unsaturated bond and 2-10 carbon atoms, $R^bO$ represents an alkoxy group having 1-4 carbon atoms, m represents an integer of 2-5, and x represents an integer of 3-7. Preferred examples of the unsaturated group $R^a$ and the alkoxy group $R^bO$ may be the same as $R^1$ and $R^2O$ in the above monomer.

The number m of condensation is 2-5, preferably 2-3. An oligomer whose number m of condensation is 5 or less can be easily obtained by the polymerization of the monomer using an acidic catalyst as described below. The number x of the alkoxy group is 3-7, preferably 3-5. The condition of x=m+2 is preferably met. When the number x of the alkoxy group is less than 3, the hydrolysis and polycondensation of the alkoxysilane does not sufficiently proceed, making three-dimensional cross-linking difficult to occur, thereby making the formation of a wet gel too difficult. When the number x is more than 7, the percentage of the unsaturated group is too small, resulting in too little increase in mechanical strength by the polymerization. Specific examples of the alkoxysilane oligomers having unsaturated groups include disilanes, trisilanes and tetrasilanes obtained by the condensation of the above alkoxysilane monomers.

(a-3) Alkoxysilane Having No Unsaturated Group

An alkoxysilane monomer having no unsaturated group or its oligomer may be used together with the alkoxysilane monomer having an unsaturated group and/or its oligomer. A ratio of the alkoxysilane monomer or oligomer having no unsaturated group to that having an unsaturated group is preferably 50% or less. When the ratio is more than 50%, the amount of the unsaturated group is too small, resulting in too little improvement in toughness of the silica aerogel coating by polymerization. Specific examples of the alkoxysilanes having no unsaturated groups may be the same as those used in the second production method described below.

(a-4) Solvent

The solvent is preferably composed of water and alcohol. The alcohol is preferably methanol, ethanol, n-propyl alcohol, and isopropyl alcohol, particularly methanol. A water/alcohol molar ratio in the solvent is preferably 0.1-2. When the water/alcohol molar ratio is more than 2, the hydrolysis proceeds too quickly. When the water/alcohol molar ratio is less than 0.1, the hydrolysis of the alkoxysilane monomer and/or oligomer (hereinafter referred to simply as "alkoxysilane") does not sufficiently occur.

(a-5) Catalyst

A catalyst is preferably added to an aqueous alkoxysilane solution. The addition of an appropriate catalyst accelerates the hydrolysis of the alkoxysilane. The catalyst may be acidic or basic. For instance, an efficient hydrolysis can be proceeded by condensing the alkoxysilane monomer to an oligomer in an aqueous solution containing an acidic catalyst, and polymerizing the resultant condensate in a solution containing a basic catalyst.

Specific examples of the acidic catalysts include hydrochloric acid, nitric acid and acetic acid. Specific examples of the basic catalysts include ammonia, amines, NaOH and KOH. Preferred examples of the amines include alcohol amines, and alkyl amines (for instance, methylamine, dimethylamine, trimethylamine, n-butylamine, and n-propylamine).

(b) Preparation of Wet Gel

The alkoxysilane is dissolved in a solvent composed of water and alcohol. A solvent/alkoxysilane molar ratio is preferably 3-100. When the molar ratio is less than 3, the degree of polymerization of the alkoxysilane is too high. When the molar ratio exceeds 100, the degree of polymerization of the alkoxysilane becomes too low. A catalyst/alkoxysilane molar ratio is preferably $1 \times 10^{-7}$-$1 \times 10^{-1}$, more preferably $1 \times 10^{-2}$-$1 \times 10^{-1}$. When the molar ratio is less than $1 \times 10^{-7}$, the hydrolysis of the alkoxysilane does not occur sufficiently. Even at a molar ratio of more than $1 \times 10^{-1}$, increased catalytic effects cannot be obtained. A water/alkoxysilane molar ratio is preferably 0.5-20, more preferably 5-10.

An alkoxysilane-containing solution is aged for about 20-60 hours. Specifically, the solution is left to stand or slowly stirred at 25-90° C. Gelation proceeds by aging, to form a wet gel containing silicon oxide. The term "wet gel containing silicon oxide" used herein means a wet gel containing silicon oxide particles and a solvent.

(c) Organic Modification

An organic-modifying agent solution was added to the wet gel. With full contact of the wet gel with the organic-modifying agent solution, hydrophilic groups such as a hydroxyl group, etc. at the end of silicon oxide constituting the wet gel are substituted by hydrophobic organic groups. The organic-modifying agent solution is preferably added to the wet gel diced to about 5-30 mm each to have a large surface area. With the wet gel provided with an increased surface area in advance, its reaction with the organic-modifying agent proceeds efficiently.

The preferred organic-modifying agent is preferably a silane coupling agent, which may or may not have an unsaturated group. The silane coupling agent having no unsaturated group is preferably a compound represented by any one of the following formulae (4)-(9);

$$R^c_p SiCl_q \quad (4),$$

$$R^c_3 SiNHSiR^c_3 \quad (5),$$

$$R^c_p Si(OH)_q \quad (6),$$

$$R^c_3 SiOSiR^c_3 \quad (7),$$

$$R^c_p Si(OM)_q \quad (8), \text{ and}$$

$$R^c_p Si(OCOCH_3)_q \quad (9),$$

wherein p is an integer of 1-3, q is an integer of 1-3 satisfying $q=4-p$, and $R^c$ is hydrogen, a substituted or unsubstituted alkyl group having 1-18 carbon atoms, or a substituted or unsubstituted aryl group having 5-18 carbon atoms, or their mixtures.

Specific examples of the organic-modifying agents having no unsaturated groups include triethylchlorosilane, trimethylchlorosilane, diethyldichlorosilane, dimethyldichlorosilane, acetoxytrimethylsilane, acetoxysilane, diacetoxydimethylsilane, methyltriacetoxysilane, phenyltriacetoxysilane, diphenyldiacetoxysilane, trimethylethoxysilane, trimethylmethoxysilane, 2-trimethylsiloxy pent-2-en-4-one, N-(trimethylsilyl)acetamide, 2-(trimethylsilyl)acetate, N-(trimethylsilyl) imidazole, trimethylsilyl propiolate, nonamethyltrisilazane, hexamethyldisilazane, hexamethyldisiloxane, trimethylsilanol, triethylsilanol, triphenylsilanol, t-butyldimethylsilanol, and diphenylsilanediol.

The organic-modifying agent may have an unsaturated group. The use of the organic-modifying agent having an unsaturated group provides a silica aerogel coating at a high degree of polymerization. Preferred examples of the unsaturated groups may be the same as those used in the second production method described below.

The organic modification is preferably conducted at 10-40° C., although variable depending on the type and concentration of the organic-modifying agent. When the organic-modifying temperature is lower than 10° C., the organic-modifying agent does not easily react with silicon oxide. When it is higher than 40° C., the organic-modifying agent easily reacts with other substances than silicon oxide. The solution is preferably stirred to avoid a distribution in temperature and concentration in the solution during the reaction. For instance, when the organic-modifying agent solution is a solution of triethylchlorosilane in hexane, holding at 10-40° C. for about 20-40 hours (for instance, 30 hours) sufficiently modifies a silanol group with a silyl group. The modification ratio is preferably 10-30%. The resultant organically modified silicon oxide is a wet gel or gel-like material.

(d) Substitution of Dispersing Medium

A dispersing medium of the wet gel influences a surface tension and/or a contact angle of a solid phase to a liquid phase, which accelerate or retard aging in the above-described aging step, an extent of surface modification in the organic modification step, and an evaporation rate in the later-described coating step. The dispersing medium contained in the gel can be substituted by another dispersing medium by repeating an operation of pouring another dispersing medium into a vessel containing the gel, vibrating the vessel and conducting decantation.

Specific examples of the substituting dispersing medium include ethanol, methanol, propanol, butanol, hexane, heptane, pentane, cyclohexane, toluene, acetonitrile, acetone, dioxane, methyl isobutyl ketone, propylene glycol monomethyl ether, ethylene glycol mono methyl ether, ethyl acetate, and their mixtures.

The more preferred substituting dispersing medium are ketones. Substitution with a ketone solvent before the later-described ultrasonic treatment step makes it possible to obtain a well-dispersible, organically modified, silica-containing sol. Because the ketone solvent has excellent affinity for silica (silicon oxide) and organically modified silica, silica and/or organically modified silica are well dispersed in the ketone solvent. Substitution with the ketone solvent may be conducted before the organic modification, or after silicon oxide is organically modified using hexane, etc. as a solvent. However, to reduce the number of steps, the substitution with the ketone solvent is preferably conducted before the organic modification.

The more preferred ketone solvent has a boiling point of 60° C. or higher. Ketones having boiling points of lower than 60° C. are evaporated too much in the later-described ultrasonic irradiation step. For instance, acetone used as a dispersing medium is much evaporated during the ultrasonic irradiation, resulting in difficulty in controlling the concentration of the dispersion. Acetone is quickly evaporated in the coating step, too, failing to keep a sufficient coating time. It is further known that acetone is harmful to humans, unpreferable for the health of an operator.

Particularly preferred as the ketone solvent is unsymmetrical ketone having different groups on both sides of a carbonyl group. Because nonsymmetrical ketone has a large polarity, it has excellent affinity particularly for silica and organically modified silica. The organically modified silica preferably has a particle size of 200 nm or less in the dispersion. When the particle size of the organically modified silica is more than 200 nm, it is difficult to form a silica aerogel coating having a substantially smooth surface.

The ketone may have an alkyl or aryl group. The preferred alkyl group has about 1-5 carbon atoms. Specific examples of the ketone solvents include methyl isobutyl ketone, ethyl isobutyl ketone, and methyl ethyl ketone.

(e) Ultrasonic Treatment

An ultrasonic treatment makes the organically modified silicon oxide gel or sol suitable for coating. In the case of the organically modified silicon oxide gel, the ultrasonic treatment dissociates a gel coagulated by an electric force or a van der Waals force, and destroys covalent bonds of silicon to oxygen, resulting in a dispersed gel. In the case of the sol, too, the ultrasonic treatment reduces the agglomeration of colloid particles. The ultrasonic treatment can be conducted by a dispersing apparatus using an ultrasonic vibrator. An ultrasonic radiation frequency is preferably 10-30 kHz, and an output is preferably 300-900 W.

The ultrasonic treatment time is preferably 5-120 minutes. Longer ultrasonic irradiation results in finer pulverization of clusters of the gel or the sol, resulting in less agglomeration. Accordingly, colloid particles of organically modified silicon oxide are almost in a single dispersion state in the silica-containing sol obtained by the ultrasonic treatment. When the ultrasonic treatment time is shorter than 5 minutes, the colloid particles are not sufficiently dissociated. Even if the ultrasonic treatment time were longer than 120 minutes, the dissociation of the colloid particles of the organically modified silicon oxide would not substantially change.

To form a silica aerogel coating having a porosity of 79-57% and a refractive index of 1.1-1.2, the ultrasonic radiation frequency is preferably 10-30 kHz, the output is preferably 300-900 W, and the ultrasonic treatment time is preferably 5-120 minutes.

A dispersing medium may be added to provide the silica-containing sol with appropriate concentration and fluidity. The dispersing medium may be added before the ultrasonic treatment, or after conducting the ultrasonic treatment to some extent. A mass ratio of the organically modified silicon oxide to the dispersing medium is preferably 0.1-20%. When the mass ratio of the organically modified silicon oxide to the dispersing medium is outside the range of 0.1-20%, a uniform thin layer cannot be formed easily.

The use of a sol containing silicon oxide colloid particles having nearly single dispersion can form an organically modified silica aerogel layer with small porosity. On the other hand, the use of a sol containing largely agglomerated colloid particles can form an organically modified silica aerogel layer with large porosity. Thus, the ultrasonic treatment time influences the porosity of the organically modified silica aerogel layer and the silica aerogel layer obtained by heat-treating it. The coating of the sol ultrasonic-treated for 5-120 minutes can provide the organically modified silica aerogel layer with a porosity of 25-90%.

(f) Addition of Photo-Polymerization Initiator

A photo-polymerization initiator is added to the ultrasonic-treated dispersion. The photo-polymerization initiator may be added in such an amount that the unsaturated group can be polymerized in the later-described ultraviolet irradiation step. Specifically, it is added preferably such that a solid content is 5-15% by mass in the dispersion. Specific examples of the photo-polymerization initiators include benzoin and its derivatives such as benzoin methyl ether, benzoin isopropyl ether, benzoin isobutyl ether, etc.; benzyl derivatives such as benzyl dimethyl ketal, etc.; acetophenone and its derivatives such as 2,2-dimethoxy-2-phenylacetophenone, 2,2-diethoxy2-phenylacetophenone, 1,1-dichloracetophenone, 1-hydroxycyclohexyl phenyl ketone, 2-methyl-1-[4-(methylthio)phenyl]-2-morpholinopropane-1-on, etc.; anthraquinone and its derivatives such as 2-methyl anthraquinone, 2-chloroanthraquinone, 2-ethylanthraquinone, 2-t-butyl anthraquinone, etc.; thioxanthone and its derivatives such as 2,4-dimethyl thioxanthone, 2-chlorothioxanthone, etc.; benzophenone and its derivatives such as N,N-dimethylaminobenzophenone, etc.

(g) Coating

When a silica-containing sol is coated, a dispersing medium constituting the sol is evaporated to form a silica gel layer. Examples of coating methods include a spray-coating method, a spin-coating method, a dip-coating method, a flow-coating method and a bar-coating method. The preferred coating method is a spray-coating method, which can form a sol layer containing organically modified silica in uniform thickness even on a rugged surface.

(h) Drying

Because the organically modified silica-containing sol contains a volatile solvent, it can be spontaneously dried, but its drying may be accelerated by heating at 50-100° C. Although the organically modified silica aerogel layer has a porosity reduced by the shrinkage of the gel due to capillary pressure during the evaporation of the dispersing medium, the porosity is recovered by a springback phenomenon after the completion of evaporation. Thus, the porosity of the dried, organically modified silica aerogel layer is substantially as large as the original one of the gel network. The shrinkage of a silica gel network and the springback phenomenon are described in U.S. Pat. No. 5,948,482 in detail.

(i) Polymerization

By ultraviolet irradiation to the organically modified silica-containing sol layer, the unsaturated group is polymerized. With the unsaturated group polymerized, the silica aerogel coating is provided with high hydrophobicity and toughness. Using an ultraviolet irradiation apparatus, the organically modified silica-containing sol layer is subjected to ultraviolet irradiation at about 50-10000 mJ/cm$^2$. The ultraviolet irradiation time is preferably about 1-30 seconds when the silica aerogel coating is as thick as about 10-2000 nm, although variable depending on the coating thickness. The ultraviolet irradiation can form a carbon chain having about 100-10000 carbon atoms, although variable depending on the type of the starting material and the polymerization conditions.

(j) Baking

The silica aerogel coating is preferably baked at 50-150° C. The baking removes a solvent from the layer and a hydroxyl group, etc. from the surface, thereby strengthening the coating. Because substituting groups are not substantially decomposed at a baking temperature of about 50-150° C., the baked silica aerogel coating has an organic-modifying chain formed by the polymerization of the unsaturated group.

[2] Second Production Method

The second method for producing a silica aerogel coating comprises the steps of reacting a wet gel formed by the hydrolysis and polymerization of an alkoxysilane with an organic-modifying agent having an ultraviolet-polymerizable unsaturated group to form a thin coating of the resultant organically modified silica, and polymerizing the unsaturated group in the coating by ultraviolet irradiation. Because the second production method is essentially the same as the first production method except for an alkoxysilane and an organic-modifying agent, which are starting materials, only differences will be explained below.

(a) Alkoxysilane and Silsesquioxane

The alkoxysilane monomer preferably has 3 or more alkoxy groups. The use of an alkoxysilane having 3 or more alkoxy groups as a starting material makes it easy to sufficiently proceed hydrolysis and polymerization, thereby providing an anti-reflection coating having excellent uniformity. Specific examples of the alkoxysilane monomers include methyltrimethoxysilane, methyltriethoxysilane, phenyltriethoxysilane, tetramethoxysilane, tetraethoxysilane, tetrabutoxysilane, tetrapropoxysilane, diethoxydimethoxysilane, dimethyldimethoxysilane, and dimethyldiethoxysilane. The alkoxysilane oligomers are preferably polycondensates of these monomers. The alkoxysilane oligomers can be obtained by the hydrolysis and polymerization of the monomers.

The use of a silsesquioxane as a starting material can also provide an anti-reflection coating with excellent uniformity. The silsesquioxane is a general name of polysiloxanes in the form of network, which are represented by the general formula: $RSiO_{1.5}$, wherein R represents an organic functional group. R may be, for instance, a linear or branched alkyl group having 1-6 carbon atoms, a phenyl group, or an alkoxy group (for instance, methoxy group, ethoxy group, etc.). It is known that the silsesquioxane has various structures such as a ladder structure, a cage structure, etc. It has excellent weather resistance, transparency and hardness, suitable as a starting material for the silica aerogel.

(b) Organic-Modifying Agent Having Unsaturated Group

A solution of the organic-modifying agent having an ultraviolet-polymerizable unsaturated group is kept in sufficient contact with the wet gel, to substitute hydrophilic groups such as a hydroxyl group, etc. at the end of silicon oxide constituting the wet gel with hydrophobic organic groups. The organic-modifying agent has a functional group reactable with hydrophilic groups such as a hydroxyl group, etc., in addition to the unsaturated group. Those having at least one unsaturated group and at least one hydrophilic group can be used as organic-modifying agents, and they may have an alkyl group such as a methyl group, an ethyl group, etc., and an aryl group such as a phenyl group, etc., in addition to these groups.

Preferred examples of the organic-modifying agents having unsaturated groups are represented by any one of the following formulae (10)-(15):

$$R^d_p SiCl_q \quad (10),$$

$$R^d_3 SiNHSiR^d_3 \quad (11),$$

$$R^d_p Si(OH)_q \quad (12),$$

$$R^d_3 SiOSiR^d_3 \quad (13),$$

$$R^d_p Si(OR^d)_q \quad (14), \text{ and}$$

$$R^d_p Si(OCOCH_3)_q \quad (15),$$

wherein p represents an integer of 1-3, q represents an integer of 1-3 meeting q=4−p, and $R^d$ represents an organic group having an ultraviolet-polymerizable, unsaturated bond and 2-10 carbon atoms. The unsaturated group $R^d$ may have a methyl group, an ethyl group, etc. Examples of the unsaturated group $R^d$ include a vinyl group, an allyl group, a methacryloxy group, an aminopropyl group, a glycidoxy group, an alkenyl group, and a propargyl group. The organic-modifying agent having an unsaturated group may be used alone or in combination. It may also be used together with an organic-modifying agent having no unsaturated group.

The organic-modifying agent is preferably chlorosilane, more preferably monochlorosilane having three unsaturated groups. Specific examples of the organic-modifying agents having unsaturated groups include triallylchlorosilane, diallyldichlorosilane, triacetoxyallylsilane, diacetoxydiallylsilane, trichlorovinylsilane, dichlorodivinylsilane, triacetoxyvinylsilane, diacetoxydiallylsilane, trimethoxy (3-butenyl) silane, triethoxy(3-butenyl)silane, di(3-butenyl) dimethoxysilane, and di(3-butenyl)diethoxysilane.

[3] Silica Aerogel Coating

The silica aerogel coating is a porous coating having fine pores of a nanometer size, which is constituted by a skeleton having Si—O bonds, and an organic-modifying chain formed by the polymerization of the unsaturated group. Both ends of the organic-modifying chain are preferably bonded to the silica skeleton to form bridges. The organically modified silica aerogel coating is hydrophobic, providing the silica aerogel coating with excellent durability. This seems to be due to the fact that the silica aerogel coating has few hydroxyl groups on the surface, so that water does not easily enter into fine pores. Also, the silica aerogel coating having an organic-modifying chain formed by polymerization has excellent toughness.

The refractive index of the silica aerogel coating varies depending on the porosity. The larger the porosity, the smaller the refractive index, and vice versa. The silica aerogel coating preferably has a refractive index of 1.05-1.30. To obtain a refractive index of less than 1.05, the anti-reflection coating 2 should have a porosity of more than 90%. Accordingly, the anti-reflection coating having a refractive index of less than 1.05 has too small mechanical strength. When the refractive index is more than 1.30, the anti-reflection coating has too large a refractive index as a low-refractive-index layer, failing to provide an excellent anti-reflection effect. The refractive index of the silica aerogel coating is more preferably 1.1-1.2, particularly 1.13. The silica aerogel coating having a refractive index of 1.13 has a porosity of about 72%.

The thickness of the silica aerogel coating may be in a range not adversely affecting the baking and the ultraviolet irradiation. When used as an anti-reflection coating, the thickness of the silica aerogel coating is about 70-170 nm. The thickness of the silica aerogel coating may be properly controlled by the concentration of the organically modified silica-containing sol, the number of spraying operations, etc.

The present invention will be explained in more detail referring to Examples below without intention of restricting the present invention thereto.

Example 1

Unsaturated Alkoxysilane (Starting Material)+Saturated Chlorosilane (Organic-Modifying Agent)

(1-i) Preparation of Wet Silica Gel Having Unsaturated Bond

After 6.21 g of 3-methacryloxypropyltrimethoxysilane was mixed with 3.04 g of methanol, 0.4 g of hydrochloric acid (0.01 N) was added thereto, and the resultant mixture was stirred at 60° C. for 3 hours. After 30.8 g of methanol and 0.5 g of an aqueous ammonia solution (0.02 N) were added, the resultant mixture was stirred for 48 hours. This mixed liquid was aged at 60° C. for 72 hours to form a wet silica gel.

(1-ii) Substitution of Solvent and Organic-Modifying Agent

After ethanol was added to a wet silica gel and vibrated for 10 hours, unreacted products, etc. were removed by decantation to substitute a dispersing medium for the wet silica gel with ethanol. Further, by decantation after methyl isobutyl ketone was added and vibrated for 10 hours, a dispersing medium of ethanol was substituted with methyl isobutyl ketone. A solution of trimethylchlorosilane in methyl isobutyl ketone (concentration: 5% by volume) was added to the wet silica gel and stirred for 30 hours to organically modify silicon oxide at ends. The resultant wet, organically modified silica gel was mixed with methyl isobutyl ketone, vibrated for 24 hours, and decanted.

(1-iii) Ultrasonic Dispersion and Addition of UV Polymerization Initiator

The wet, organically modified silica gel was mixed with methyl isobutyl ketone to a concentration of 1% by mass, and ultrasonic irradiation (20 kHz, 500 W) was conducted to turn it to a sol. The ultrasonic irradiation time was 20 minutes. 2-methyl-1-[4-(methylthio)phenyl]-2-morpholinopropane-1-on was added to this sol-like dispersion in an amount of 3% by mass based on a solid silica content, to form a coating liquid containing an organically modified silica.

(1-iv) Dip Coating

The coating liquid containing an organically modified silica, which was obtained in the step (1-iii), was dip-coated on a glass substrate, and polymerized by ultraviolet irradiation at 1500 mJ/cm² using a UV irradiation apparatus available from Fusion Systems. Baking at 150° C. for 1 hour caused hydrolysis and polycondensation, thereby forming a silica aerogel coating having an organic-modifying chain.

Example 2

Saturated Alkoxysilane (Starting Material)+Unsaturated Chlorosilane (Organic-Modifying Agent)

(2-i) Preparation of Silica Wet Gel

After 5.90 g of an oligomer (Methyl Silicate 51 available from COLCOAT having an average structure of a tetramethoxysilane trimer) was mixed with 50.55 g of methanol, 3.20 g of ammonia water (0.05 N) was added to the resultant mixture and stirred for 30 minutes. This mixed liquid was aged at room temperature for 72 hours to form a wet silica gel.

(2-ii) Substitution of Solvent and Organic-Modifying Agent Having Unsaturated Bond After ethanol was added to the wet silica gel and vibrated for 10 hours, unreacted products, etc. were removed by decantation, and a dispersing medium for the wet silica gel was substituted with ethanol. Further, after methyl isobutyl ketone was added and vibrated for 10 hours, the dispersing medium of ethanol was substituted with methyl isobutyl ketone by decantation. A solution of allyldimethylchlorosilane in methyl isobutyl ketone (concentration 5% by volume) was added to the wet silica gel and stirred for 30 hours to organically modify silicon oxide at ends. Methyl isobutyl ketone was added to the resultant wet, organically modified silica gel, vibrated for 24 hours, and decanted.

(2-iii) Ultrasonic Dispersion and Addition of UV Polymerization Initiator

Methyl isobutyl ketone was added to organically modified silica to a concentration of 1% by mass, and ultrasonic irradiation (20 kHz, 500 W) was conducted to turn it to a sol. The ultrasonic irradiation time was 20 minutes. 2-methyl-1-[4-(methylthio)phenyl]-2-morpholinopropane-1-on was added to this liquid in an amount of 3% by mass based on a solid silica content to form a coating liquid.

(2-iv) Dip Coating

The coating liquid containing an organically modified silica, which was obtained in the step (2-iii) was dip-coated on a glass substrate, and polymerized by ultraviolet irradiation at 1500 mJ/cm$^2$ using a UV irradiation apparatus available from Fusion Systems. Baking at 150° C. for 1 hour caused hydrolysis and polycondensation, thereby forming a silica aerogel coating having an organic-modifying chain.

Example 3

Unsaturated Alkoxysilane (Starting Material)+Unsaturated Chlorosilane (Organic-Modifying Agent)

(3-i) Preparation of Wet Silica Gel Having Unsaturated Bond

After 6.21 g of 3-methacryloxypropyltrimethoxysilane was mixed with 3.04 g of methanol, 0.4 g of hydrochloric acid (0.01 N) was added to the resultant mixture and stirred at 60° C. for 3 hours. After 30.8 g of methanol and 0.5 g of an aqueous ammonia solution (0.02 N) were added to the mixture and stirred for 48 hours, the resultant mixed liquid was aged at 60° C. for 72 hours to form a wet silica gel.

(3-ii) Substitution of Solvent and Organic-Modifying Agent Having Unsaturated Bond After ethanol was added to the wet silica gel and vibrated for 10 hours, decantation was conducted to remove unreacted products, etc. and to substitute a dispersing medium for the wet silica gel with ethanol. Methyl isobutyl ketone was then added and vibrated for 10 hours. A dispersing medium of ethanol was substituted with methyl isobutyl ketone by decantation. A solution of allyldimethylchlorosilane in methyl isobutyl ketone (concentration: 5% by volume) was added to the wet silica gel and stirred for 30 hours to organically modify silicon oxide at ends. Methyl isobutyl ketone was added to the resultant wet, organically modified silica gel, vibrated for 24 hours, and decanted.

(3-iii) Ultrasonic Dispersion and Addition of UV Polymerization Initiator

The wet, organically modified silica gel was mixed with methyl isobutyl ketone to a concentration of 1% by mass, and turned to a sol by ultrasonic irradiation (20 kHz, 500 W). The ultrasonic irradiation time was 20 minutes. 2-methyl-1-[4-(methylthio)phenyl]-2-morpholinopropane-1-on was added to this sol dispersion in an amount of 3% by mass based on a solid silica content, to form a coating liquid.

(3-iv) Dip Coating

The coating liquid containing an organically modified silica, which was obtained in the step (3-iii), was dip-coated on a glass substrate, and polymerized by ultraviolet irradiation at 1500 mJ/cm$^2$ using a UV irradiation apparatus available from Fusion Systems. Baking at 150° C. for 1 hour caused hydrolysis and polycondensation, thereby forming a silica aerogel coating having an organic-modifying chain.

Example 4

Saturated Alkoxysilane/Unsaturated Alkoxysilane (at 1/2) (Starting Material)+Saturated Chlorosilane (Organic-Modifying Agent)

(4-i) Preparation of Wet Silica Gel Having Unsaturated Bond

After 2.37 g of an oligomer (Methyl Silicate 51 available from COLCOAT having an average structure of a tetramethoxysilane trimer), 3.22 g of 3-methacryloxypropyltrimethoxysilane, and 40.44 g of methanol were mixed, 2.56 g of ammonia water (0.05 N) was added to the resultant mixture and stirred for 30 minutes. The resultant mixed liquid was aged at room temperature for 72 hours to form a wet silica gel.

(4-ii) Substitution of Solvent and Organic-Modifying Agent

After ethanol was added to the wet silica gel and vibrated for 10 hours, decantation was conducted to remove unreacted products, etc. and to substitute a dispersing medium for the wet silica gel with ethanol. Methyl isobutyl ketone was then added and vibrated for 10 hours, and a dispersing medium of ethanol was substituted with methyl isobutyl ketone by decantation. A solution of trimethylchlorosilane in methyl isobutyl ketone (concentration: 5% by volume) was added to the wet silica gel and stirred for 30 hours to organically modify silicon oxide at ends. Methyl isobutyl ketone was added to the resultant wet, organically modified silica gel, vibrated for 24 hours, and decanted.

(4-iii) Ultrasonic Dispersion and Addition of UV Polymerization Initiator

The organically modified silica was mixed with methyl isobutyl ketone to a concentration of 1% by mass, and turned to a sol by ultrasonic irradiation (20 kHz, 500 W). The ultrasonic irradiation time was 20 minutes. 2-methyl-1-[4-(methylthio)phenyl]-2-morpholinopropane-1-on was added to this sol dispersion in an amount of 3% by mass based on a solid silica content, to form a coating liquid.

(4-iv) Dip Coating

The coating liquid containing an organically modified silica, which was obtained in the step (4-iii), was dip-coated on a glass substrate, and polymerized by ultraviolet irradiation at 1500 mJ/cm$^2$ using a UV irradiation apparatus available from Fusion Systems. Baking at 150° C. for 1 hour caused hydrolysis and polycondensation, thereby forming a silica aerogel coating having an organic-modifying chain.

Example 5

Saturated Alkoxysilane/Unsaturated Alkoxysilane (at 1/2) (Starting Material)+Unsaturated Chlorosilane (Organic-Modifying Agent)

(5-i) Preparation of Wet Silica Gel Having Unsaturated Bond 2.37 g of an oligomer (Methyl Silicate 51 available from COLCOAT having an average structure of a tetramethoxysilane trimer), 3.22 g of 3-methacryloxypropyltrimethoxysilane, and 40.44 g of methanol were mixed, and 2.56 g of ammonia water (0.05 N) was added to the resultant mixture and stirred for 30 minutes. The resultant mixed liquid was aged at room temperature for 72 hours to form a wet silica gel.

(5-ii) Substitution of Solvent and Organic-Modifying Agent Having Unsaturated Bond After ethanol was added to the wet silica gel and vibrated for 10 hours, decantation was conducted to remove unreacted products, etc. and to substitute a dispersing medium for the wet silica gel with ethanol. Further, after methyl isobutyl ketone was added thereto and vibrated for 10 hours, a dispersing medium of ethanol was substituted with methyl isobutyl ketone by decantation. A solution of allyldimethylchlorosilane in methyl isobutyl ketone (concentration: 5% by volume) was added to the wet silica gel, and stirred for 30 hours to organically modify silicon oxide at ends. Methyl isobutyl ketone was added to the resultant wet, organically modified silica gel, vibrated for 24 hours, and decanted.

(5-iii) Ultrasonic Dispersion and Addition of UV Polymerization Initiator

The organically modified silica was mixed with methyl isobutyl ketone to a concentration of 1% by mass, and turned to a sol by ultrasonic irradiation (20 kHz, 500 W). The ultrasonic irradiation time was 20 minutes. 2-methyl-1-[4-(methylthio)phenyl]-2-morpholinopropane-1-on was added to this sol dispersion silica in an amount of 3% by mass based on a solid content, to form a coating liquid.

(5-iv) Dip Coating

The coating liquid containing an organically modified silica, which was obtained in the step (5-iii), was dip-coated on a glass substrate, and polymerized by ultraviolet irradiation at 1500 mJ/cm$^2$ using a UV irradiation apparatus available from Fusion Systems. Baking at 150° C. for 1 hour caused hydrolysis and polycondensation, thereby forming a silica aerogel coating having an organic-modifying chain.

Example 6

Saturated Alkoxysilane (Starting Material)+Saturated Chlorosilane/Unsaturated Chlorosilane (at 1/1) (Organic-Modifying Agent)

(6-i) Preparation of Wet Silica Gel

After 5.90 g of an oligomer (Methyl Silicate 51 available from COLCOAT having an average structure of a tetramethoxysilane trimer) and 50.55 g of methanol were mixed, 3.20 g of ammonia water (0.05 N) was added to the resultant mixture and stirred for 30 minutes. The resultant mixed liquid was aged at room temperature for 72 hours to form a wet silica gel.

(6-ii) Substitution of Solvent and Organic-Modifying Agent Having Unsaturated Bond After ethanol was added to the wet silica gel and vibrated for 10 hours, decantation was conducted to remove unreacted products, etc. and to substitute a dispersing medium for the wet silica gel with ethanol. Further, after methyl isobutyl ketone was added thereto and vibrated for 10 hours, a dispersing medium of ethanol was substituted with methyl isobutyl ketone by decantation. A mixed solution of trimethylchlorosilane and allyldimethylchlorosilane in methyl isobutyl ketone (volume ratio of methyl isobutyl ketone/trimethylchlorosilane/allyldimethylchlorosilane: 90/5/5) was added to the wet silica gel, and stirred for 30 hours to organically modify silicon oxide at ends. Methyl isobutyl ketone was added to the resultant wet, organically modified silica gel, vibrated for 24 hours, and decanted.

(6-iii) Ultrasonic Dispersion and Addition of UV Polymerization Initiator

The wet, organically modified silica gel was mixed with methyl isobutyl ketone to a concentration of 1% by mass, and turned to a sol by ultrasonic irradiation (20 kHz, 500 W). The ultrasonic irradiation time was 20 minutes. 2-methyl-1-[4-(methylthio)phenyl]-2-morpholinopropane-1-on was added to this solution in an amount of 3% by mass based on a solid content, to form a coating liquid.

(6-iv) Dip Coating

The coating liquid containing an organically modified silica, which was obtained in the step (6-iii), was dip-coated on a glass substrate, and polymerized by ultraviolet irradiation at 1500 mJ/cm$^2$ using a UV irradiation apparatus available from Fusion Systems. Baking at 150° C. for 1 hour caused hydrolysis and polycondensation, thereby forming a silica aerogel coating having an organic-modifying chain.

Example 7

Unsaturated Alkoxysilane (Starting Material)+Saturated Chlorosilane/Unsaturated Chlorosilane (at 1/1) (Organic-Modifying Agent)

(7-i) Preparation of Wet Silica Gel Having Unsaturated Bond

After 6.21 g of 3-methacryloxypropyltrimethoxysilane was mixed with 3.04 g of methanol, 0.4 g of hydrochloric acid (0.01 N) was added to the resultant mixture and stirred at 60° C. for 3 hours. After 30.8 g of methanol and 0.5 g of an aqueous ammonia solution (0.02 N) were added to the mixture and stirred for 48 hours, the resultant mixed liquid was aged at 60° C. for 72 hours to form a wet silica gel.

(7-ii) Substitution of Solvent and Organic-Modifying Agent Having Unsaturated Bond After ethanol was added to the wet silica gel and vibrated for 10 hours, decantation was conducted to remove unreacted products, etc. and to substitute a dispersing medium for the wet silica gel with ethanol. Further, after methyl isobutyl ketone was added and vibrated for 10 hours, a dispersing medium of ethanol was substituted with methyl isobutyl ketone by decantation. A mixed solution of trimethylchlorosilane and allyldimethylchlorosilane in methyl isobutyl ketone (volume ratio of methyl isobutyl ketone/trimethylchlorosilane/allyldimethylchlorosilane: 90/5/5) was added to the wet silica gel, and stirred for 30 hours to organically modify silicon oxide at ends. Methyl isobutyl ketone was added to the resultant wet, organically modified silica gel, vibrated for 24 hours, and decanted.

(7-iii) Ultrasonic Dispersion and Addition of UV Polymerization Initiator

The wet, organically modified silica gel was mixed with methyl isobutyl ketone to a concentration of 1% by mass, and turned to a sol by ultrasonic irradiation (20 kHz, 500 W). The ultrasonic irradiation time was 20 minutes. 2-methyl-1-[4-(methylthio)phenyl]-2-morpholinopropane-1-on was added to this sol dispersion in an amount of 3% by mass based on a solid silica content, to form a coating liquid.

(7-iv) Dip Coating

The coating liquid containing an organically modified silica, which was obtained in the step (7-iii), was dip-coated on a glass substrate, and polymerized by ultraviolet irradiation at 1500 mJ/cm$^2$ using a UV irradiation apparatus available from Fusion Systems. Baking at 150° C. for 1 hour caused hydrolysis and polycondensation, thereby forming a silica aerogel coating having an organic-modifying chain.

Example 8

Saturated Alkoxysilane/Unsaturated Alkoxysilane (at 1/2) (Starting Material)+Saturated Chlorosilane/Unsaturated Chlorosilane (at 1/1) (Organic-Modifying Agent)

(8-i) Preparation of Wet Silica Gel Having Unsaturated Bond

After 2.37 g of an oligomer (Methyl Silicate 51 available from COLCOAT having an average structure of a tetramethoxysilane trimer), 3.22 g of 3-methacryloxypropyltrimethoxysilane, and 40.44 g of methanol were mixed, 2.56 g of ammonia water (0.05 N) was added to the resultant mixture and stirred for 30 minutes. The resultant mixed liquid was aged at room temperature for 72 hours to form a wet silica gel.

(8-ii) Substitution of Solvent and Organic-Modifying Agent Having Unsaturated Bond After ethanol was added to the wet silica gel and vibrated for 10 hours, decantation was conducted to remove unreacted products, etc. and to substitute a dispersing medium for the wet silica gel with ethanol. Further, after methyl isobutyl ketone was added to the mixture and vibrated for 10 hours, a dispersing medium of ethanol was substituted with methyl isobutyl ketone by decantation. A mixed solution of trimethylchlorosilane and allyldimethylchlorosilane in methyl isobutyl ketone (volume ratio of methyl isobutyl ketone/trimethylchlorosilane/allyldimethylchlorosilane: 90/5/5) was added to the wet silica gel, and stirred for 30 hours to organically modify silicon oxide at ends. Methyl isobutyl ketone was added to the resultant wet, organically modified silica gel, vibrated for 24 hours, and decanted.

(8-iii) Ultrasonic Dispersion and Addition of UV Polymerization Initiator

The organically modified silica was mixed with methyl isobutyl ketone to a concentration of 1% by mass, and turned to a sol by ultrasonic irradiation (20 kHz, 500 W). The ultrasonic irradiation time was 20 minutes. 2-methyl-1-[4-(methylthio)phenyl]-2-morpholinopropane-1-on was added to this sol dispersion in an amount of 3% by mass based on a solid silica content, to form a coating liquid.

(8-iv) Dip Coating

The coating liquid containing an organically modified silica, which was obtained in the step (8-iii), was dip-coated on a glass substrate, and polymerized by ultraviolet irradiation at 1500 mJ/cm$^2$ using a UV irradiation apparatus available from Fusion Systems. Baking at 150° C. for 1 hour caused hydrolysis and polycondensation, thereby forming a silica aerogel coating having an organic-modifying chain.

EFFECT OF THE INVENTION

In the first method of the present invention for producing a silica aerogel coating, the alkoxysilane having an unsaturated group as a starting material is subjected to a sol-gel reaction, coated, and irradiated with ultraviolet rays to polymerize the unsaturated group. In the second method for producing a silica aerogel coating, the alkoxysilane is hydrolyzed and polymerized, reacted with an organic-modifying agent having an unsaturated group to form a layer of the resultant organically modified silica, and irradiated with ultraviolet rays to polymerize the unsaturated group. In both production methods, Si—O—Si bonds are formed by the hydrolysis and polymerization of the alkoxysilane, and C—C bonds are formed by the ultraviolet polymerization of the unsaturated group. Accordingly, the silica aerogel coating has a silica skeleton having nanometer-sized pores and an organic-modifying chain formed by the polymerization of the organic group.

The polymerized organic group contributes to the hydrophobicity and toughness of the silica aerogel coating. Because the silica aerogel coating of the present invention having a silica skeleton and an organic-modifying chain has a low refractive index, a feature of the silica aerogel, and excellent toughness and water repellency, a feature of the polymerized organic group, it is suitable as an anti-reflection coating.

The present disclosure relates to subject matter contained in Japanese Patent Application No. 2005-125593 filed on Apr. 22, 2005, which is expressly incorporated herein by reference in its entirety.

What is claimed is:

1. A method for producing a silica aerogel coating comprising:
   producing a wet gel formed by the hydrolysis and polymerization of an alkoxysilane having an ultraviolet-polymerizable unsaturated group;
   organically modifying the wet gel with an organic-modifying agent to obtain an organically modified silica having a modification ratio of 10-30% based on a total amount of Si—OH in the wet gel;
   coating a dispersion of said organically modified silica on a substrate to form a layer; and
   subjecting said layer of the organically modified silica to ultraviolet irradiation and baking,
   wherein the silica aerogel coating consists essentially of the organically modified silica and wherein the silica aerogel coating has a refractive index in the range of 1.05-1.2.

2. The method for producing a silica aerogel coating according to claim 1, wherein said alkoxysilane is a monosilane having an unsaturated group and an alkoxy group; wherein said monosilane is polymerized to an oligomer using an acidic catalyst; and wherein said oligomer is polymerized using a basic catalyst to obtain said wet gel.

3. The method for producing a silica aerogel coating according to claim 1, wherein the organic-modifying agent is a silane coupling agent.

4. The method for producing a silica aerogel coating according to claim 1, wherein the organic-modifying agent is an organic-modifying agent having an ultraviolet-polymerizable unsaturated group.

5. The method for producing a silica aerogel coating according to claim 1, wherein said organic-modifying agent is a monochlorosilane having an unsaturated group.

6. The method for producing a silica aerogel coating according to claim 1, wherein said organically modified silica is dispersed by an ultrasonic treatment.

7. The method for producing a silica aerogel coating according to claim 1, wherein a dispersing medium for said dispersion is at least one selected from the group consisting of carboxylic esters, ketones and alcohols.

8. The method for producing a silica aerogel coating according to claim 1, wherein a polymerization initiator is added to said dispersion.

9. The method for producing a silica aerogel coating according to claim 1, wherein a solvent for said wet gel is an alcohol having 1-3 carbon atoms.

10. The method for producing a silica aerogel coating according to claim 1, wherein the temperature of said baking is 50-150° C.

11. A method for producing a silica aerogel coating comprising:
producing a wet gel formed by the hydrolysis and polymerization of an alkoxysilane;
reacting the wet gel with an organic-modifying agent having an ultraviolet-polymerizable unsaturated group to obtain an organically modified silica having a modification ratio of 10-30% based on a total amount of Si—OH in the wet gel;
coating a dispersion of said organically modified silica on a substrate to form a layer; and
subjecting said layer of the organically modified silica to ultraviolet irradiation and baking,
wherein the silica aerogel coating consists essentially of the organically modified silica and wherein the silica aereogel coating has a refractive index in the range of 1.05-1.2.

12. The method for producing a silica aerogel coating according to claim 11, wherein said alkoxysilane is polymerized to an oligomer using an acidic catalyst, and said oligomer is polymerized using a basic catalyst to obtain said wet gel.

13. The method for producing a silica aerogel coating according to claim 11, wherein said organic-modifying agent is a monochlorosilane having an unsaturated group.

14. The method for producing a silica aerogel coating according to claim 11, wherein said organically modified silica is dispersed by an ultrasonic treatment.

15. The method for producing a silica aerogel coating according to claim 11, wherein a dispersing medium for said dispersion is at least one selected from the group consisting of carboxylic esters, ketones and alcohols.

16. The method for producing a silica aerogel coating according to claim 11, wherein a polymerization initiator is added to said dispersion.

17. The method for producing a silica aerogel coating according to claim 11, wherein a solvent for said wet gel is an alcohol having 1-3 carbon atoms.

18. The method for producing a silica aerogel coating according to claim 11, wherein the temperature of said baking is 50-150° C.

19. The method for producing a silica aerogel coating according to claim 1, wherein said organic-modifying agent is at least one of trialkylchlorosilane and allyldialkylchlorosilane.

20. The method for producing a silica aerogel coating according to claim 11, wherein said organic-modifying agent is at least one of trialkylchlorosilane and allyldialkylchlorosilane.

21. The method for producing a silica aerogel coating according to claim 19, wherein said organic-modifying agent is at least one of trimethylchlorosilane and allyldimethylchlorosilane.

22. The method for producing a silica aerogel coating according to claim 20, wherein said organic-modifying agent is at least one of trimethylchlorosilane and allyldimethylchlorosilane.

* * * * *